United States Patent Office 3,474,059
Patented Oct. 21, 1969

3,474,059
TACKIFIER COMPOSITIONS FOR ELASTOMERIC OLEFIN POLYMERS
Ralph W. Body, Wilmington, Del., assignor to Hercules Incorporated, Wilmington, Del., a corporation of Delaware
No Drawing. Filed Apr. 5, 1967, Ser. No. 628,532
Int. Cl. C08h *11/04;* C08f *37/16*
U.S. Cl. 260—27
24 Claims

ABSTRACT OF THE DISCLOSURE

A tackifying composition comprising, by weight, (I) from about 80% to about 20% of a reaction product derived by reaction of (a) an ester of (i) a polyol, e.g., ethylene glycol, glycerol or pentaerythritol and (ii) a stabilized rosin of a bromine number of less than 50 and (b) diazomethane, acetone dimethylacetal or an alkylene oxide, said reaction product having an acid number of less than about 5, and (II) from about 20% to about 80% of a reaction product derived by reaction of (x) a rosin material, e.g., disproportionated rosin or hydrogenated rosin having a bromine number of less than 50 and (y) diazomethane, acetone dimethylacetal or an alkylene oxide, said reaction product having an acid number of less than about 5. This composition is incorporated into elastomeric polymers to provide tack. Examples said polymers are: copolymers of ethylene and at least one a-olefin having the structure R—CH=CH$_2$ wherein R is a C$_1$-C$_8$ alkyl radical; unsaturated interpolymers of ethylene, at least one a-olefin having the structure R—CH=CH$_2$ wherein R is a C$_1$-C$_8$ alkyl radical, and at least one nonconjugated hydrocarbon diene or mixtures of the aforesaid polymers.

---

This invention relates to the synthetic rubber art.

Particularly, this invention relates to novel tackifier compositions for use in providing tack in rubbery copolymers of ethylene and another copolymerizable monomer selected from α-monoolefins such as propylene (rubbery copolymers of ethylene and propylene being sometimes referred to in the art as "EPR") and in sulfur vulcanizable unsaturated rubber-like interpolymers of ethylene, at least one other copolymerizable monomer selected from α-monoolefins, and at least one nonconjugated hydrocarbon diene; and to the rubbery compositions comprised of the novel tackifier composition of this invention and at least one of the above-described rubber-like copolymers and interpolymers.

In the preparation of articles from synthetic rubber, it is often necessary to assemble articles from smaller pieces. For example, a tire is usually constructed or built by applying layers of rubber-coated fabric one to another, followed by a breaker strip, cushion, and tread. The layers must possess sufficient surface tack to adhere firmly one to another and to maintain the desired relative position of the various parts prior to vulcanization. Absence of tack in many cases causes difficulty in the building operation. Thus, tack is an important property in the tire-building field for here it is necessary to put the various parts of the tire together in a matter of minutes such as, for example, about 2 minutes to 5 minutes, in order that the operation be economically feasible. Since tires generally comprise from 2 to 10 plies, it is apparent that the surface of the plies must adhere readily one to another in order to permit rapid building and yet produce a tire that will not prove faulty in use. Tack is also important in all applications requiring the "laying-up" of plies such, for example, as in hose manufacture and in belt manufacture.

Recently, there has been introduced to the tire manufacturer a sulfur vulcanizable unsaturated rubberlike (elastomeric) interpolymer of (1) ethylene, (2) at least one α-olefin, such as propylene, having the structure R—CH=CH$_2$ where R is a C$_1$-C$_8$ alkyl radical, and (3) a nonconjugated hydrocarbon diene such, for example, as 1,4-hexadiene and dicyclopentadiene. To date, the most interesting commercially of the elastomeric polymers are those derived from ethylene, propylene, and a nonconjugated hydrocarbon diene. An elastomeric interpolymer of this type is referred to in the art as an unsaturated, vulcanizable, rubbery terpolymer of ethylene, propylene, and a copolymerizable diene; ethylene-propylene terpolymer (EPT); and ethylene-propylene-diene methylene (EPDM).

These elastomeric interpolymers do not have sufficient tack to be used economically in the manufacture of tires for automobiles, and the like. This is a fact well known in the art and many attempts have been made to solve this problem. The difficulty, industry-wide, is to develop tack without impairing the vulcanization rates and without impairing the properties of vulcanizates such as modulus, elongation, heat build-up, and the like.

In accordance with this invention it has been determined that the adhesive properties of the interpolymers can be improved substantially by the incorporation therein of a relatively small amount of a tackifier additive comprised of at least two specific rosin-base materials to be detailed more fully hereinafter. The tackifier additives of this invention do not affect adversely, to any substantial degree, the cure rate of the interpolymers or the physical properties of vulcanizates prepared therefrom.

This invention is directed to a tackifier additive comprised of at least two rosin-base materials for use in imparting tack to rubbery polymers such as EPR and to EPDM.

This invention is directed also to a novel composition of matter comprised of (A) at least one sulfur-vulcanizable interpolymer of (1) ethylene, (2) an α-monoolefin having the structure R—CH=CH$_2$ where R is an alkyl radical of not more than 8 carbon atoms, and (3) a nonconjugated hydrocarbon diene, sometimes referred to hereinafter as "rubber component (A)," and (B) a relatively small amount of a tackifier additive comprised of at least two rosin-base materials to be detailed hereinafter.

RUBBER COMPONENT (A)

The sulfur-vulcanizable elastomeric interpolymers employed in this invention are derived by copolymerizing ethylene; an α-monoolefin having the structure $$R—CH=CH_2$$

wherein R is an alkyl radical of not more than 8 carbon atoms; and a nonconjugated hydrocarbon diene, by known methods.

Examples of useful α-monoolefins having the structure R—CH=CH$_2$, as above defined, include propylene; 1-butene; 1-heptene; 1-decene; 1-pentene; 5-methyl-1-hexene; 4-methyl-1-pentene; 1-octene; 5,5-dimethyl-1-octene; 4-methyl-1-hexene; 4,4-dimethyl-1-pentene; 1-hexene; 1-nonene; 5-methyl-1-nonene; 5-methyl-1-heptene; 6-methyl-1-heptene; 4,4-dimethyl-1-hexene; and 5,6,6-trimethyl-1-heptene.

Examples of dienes include dicyclopentadiene; tricyclopentadiene; tetracyclopentadiene; 5-alkenyl-substituted 2-norbornene; 5-methylene-2-norbornene; and 2-alkyl-2,5-norbornadienes.

Another suitable diene is an aliphatic diene having the structure (I) 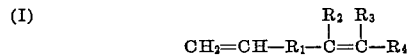

wherein R$_1$ is an alkylene radical; R$_2$ and R$_3$ are selected independently from the group consisting of hydrogen and alkyl radicals; and $R_4$ is an alkyl radical; and wherein $R_1$ through $R_4$ are so selected that the aliphatic diene has from about 6–22 carbon atoms. Specific examples of aliphatic dienes having the above structure (I) include 1,4-hexadiene;
1,9-octadecadiene;
6-methyl-1,5-heptadiene;
7-methyl-1,6-octadiene;
11-ethyl-1,11-tridecadiene;
9-ethyl-1,9-undecadiene;
7-ethyl-1,7-nonadiene;
8-propyl-1,8-undecadiene;
8-ethyl-1,8-decadiene;
10-ethyl-1,9-dodecadiene;
12-ethyl-1,12-tetradecadiene;
13-n-butyl-1,12-heptadecadiene; and
15-ethyl-1,15-heptadecadiene.

Dienes such as 11-ethyl-1,11-tridecadiene are made by reacting an alkyl Grignard reagent with the alkyl ester of an omega-unsaturated carboxylic acid and dehydrating the tertiary alcohol thereby produced.

Examples of interpolymers of ethylene, at least one α-monoolefin, and at least one of the above aliphatic dienes include ethylene/propylene/1,4-hexadiene; ethylene/1-butene/1,4-hexadiene; ethylene/1-butene/1,4-hexadiene/11-ethyl - 1,11 - tridecadiene; ethylene/1-butene/1-octene/6-methyl-1,5-heptadiene; and ethylene/1-pentene/1,4-hexadiene/1,9-octadecadiene.

Examples of interpolymers of ethylene, at least one α-monoolefin as above defined, and dicyclopentadiene include ethylene/propylene/dicyclopentadiene;
ethylene/1-butene/dicyclopentadiene;
ethylene/propylene/1-butene/dicyclopentadiene;
ethylene/1-octene/dicyclopentadiene;
ethylene/propylene/1-hexene/dicyclopentadiene;
ethylene/1-heptene/1-decene/dicyclopentadiene; and
ethylene/5-methyl-1-heptene/dicyclopentadiene.

The diene employed to prepare the polymers used in this invention can be 5-alkylidene-2-norbornene, such as 5-methylene-2-norbornene and 5-ethylidene-2-norbornene. 5-methylene-2-norbornene can be prepared by the method disclosed and described in Patent 3,162,620, reference to which is hereby made. 5-methylene-2-norbornene can be represented by the structure

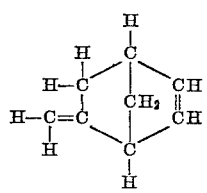

Examples of interpolymers of ethylene, at least one α-monoolefin as defined above, and 5-methylene-2-norbornene include ethylene/propylene/5-methylene-2-norbornene;
ethylene/1-butene/5-methylene-2-norbornene;
ethylene/1-decene/5-methylene-2-norbornene;
ethylene/5,5-dimethyl-1-octene/5-methylene-2-norbornene;
ethylene/4-methyl-1-hexene/5-methylene-2-norbornene;
ethylene/4,4-dimethyl-1-pentene/5-methylene-2-norbornene; and
ethylene/5,6,6-trimethyl-1-heptene/5-methylene-2-norbornene;

The 5-alkenyl-2-norbornenes that can be employed in preparing the interpolymers used in this invention can be represented by the structure (III)

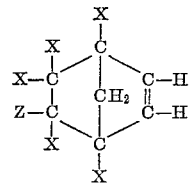

wherein each X represents hydrogen or a monovalent alkyl radical of from 1 to 6 carbon atoms and Z represents a monovalent alkenyl radical, the carbon-to-carbon double bond therein being internal. Specific examples of 5-alkenyl-2-norbornenes include 5-(2'-butenyl)-2-norbornene derived from cyclopentadiene and 1,4-hexadiene; 5-(1'-propenyl)-2-norbornene derived from cyclopentadiene and 1,3-pentadiene;

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Examples of interpolymers of ethylene, at least one α-monoolefin, and a 5-alkenyl-2-norbornene include ethylene/propylene/5-(2'-butenyl)-2-norbornene;
ethylene/propylene/5-(2'-ethyl-2'-butenyl)-2-norbornene;
ethylene/propylene/5-(2'-ethyl-1'-butenyl)-2-norbornene;
ethylene/propylene/5-(1'-propenyl)-2-norbornene;
ethylene/1-butene/5-(2'-heptyl-1'-undecenyl)-2-norbornene;
ethylene/1-butene/5-(2'-butenyl)-2-norbornene;
ethylene/1-butene/5-(2'-ethyl-2'-butenyl)-2- norbornene;
ethylene/4,4-dimethyl-1-hexene/5-(2'-propyl-2'-pentenyl)-2-norbornene;
ethylene/5,5-dimethyl-1-octene/5-(2'-nonyl-2'-heptenyl)-2-norbornene;
ethylene/6-methyl-1-heptene/5-(2'-methyl-2'-decenyl)-2-norbornene;
ethylene/1-decene/5-(2'-hexyl-2'-butenyl)-2-norbornene; and
ethylene/5,6,6-trimethyl-1-heptene/5-(2'-octyl-2'-butenyl)-2-norbornene.

2-alkyl-2,5-norbornadienes can be employed as the diene component and can be represented by the structure

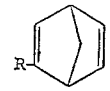

(IV)

where R is a $C_1$–$C_6$ alkyl radical. These dienes are made by heating acetylenes having the formula R—C≡C—H, where R is a $C_1$–$C_8$ alkyl radical, with cyclopentadiene at 175° C. to 225° C. in the absence of a polymerization initiator. Closed reaction vessels made from stainless steel or glass-lined steel are satisfactory.

Interpolymers of ethylene, at least one α-monoolefin, as are described, and a 2-alkyl-substituted 2,5-norbornadiene include ethylene/propylene/2-methyl-2,5-norbornadiene;
ethylene/propylene/2-ethyl-2,5-norbornadiene;
ethylene/1-butene/2-methyl-2,5-norbornadiene;
ethylene/1-hexene/2-ethyl-2,5-norbornadiene;
ethylene/1decene/2-butyl-2,5-norbornadiene; and
ethylene/1-heptene/2-octyl-2,5-norbornadiene.

Sulfur-vulcanizable elastomeric interpolymers of ethylene, propylene, and 1,4-hexadiene containing from about 1–15 mole percent of 1,4-hexadiene and not over 75 weight percent of ethylene, having an iodine number of from 3–50 and an intrinsic viscosity in benzene at 25° C. from about 0.5–5.0, are particularly suitable for use in the manufacture of automobile tires, and the like. The interpolymer and related interpolymers, and their method of manufacture, are disclosed and described in Patent 2,933,480, reference to which is hereby made.

Sulfur-vulcanizable elastomeric interpolymers that also have particular utility in the manufacture of tires and the like are the interpolymers consisting of ethylene, propylene, and dicyclopentadiene having at least about 20% to about 74.5% of ethylene units and at least 25–79.5% of propylene units by weight and about 0.5–10% of dicyclopentadiene units by weight in the interpolymer. Interpolymers of this type and related interpolymers as well as their method of preparation are disclosed and described in Patent 3,000,866, reference to which is hereby made.

Interpolymers derived from 5-alkenyl-2-norbornenes and their method of preparation are disclosed and described in Patent 3,093,620, reference to which is hereby made. These interpolymers can be defined as sulfur-vulcanizable elastomeric interpolymers of ethylene, at least one α-olefin having the structure R—CH=CH$_2$ wherein R is a C$_1$–C$_8$ alkyl radical, and 5-alkenyl-2-norbornene, the said alkenyl radical having from 3–18 carbon atoms, the carbon-to-carbon double bond of the alkenyl radical being internal. The interpolymers have an iodine number between about 5 and 60 and contain at least about 20% ethylene units by weight, at least 25% of α-olefin units by weight, and at least about 0.03 gram-mole per 100 grams of said copolymer and not over about 20% by weight of said interpolymer of 5-alkenyl-2-norbornene.

Interpolymers derived from 5-methylene-2-norbornene and their method of preparation are disclosed and described in Patent 3,093,621, reference to which is hereby made. These interpolymers can be defined as sulfur-vulcanizable elastomeric interpolymers of ethylene, at least one α-olefin having the structure R—CH=CH$_2$ wherein R is a C$_1$–C$_8$ alkyl radical, such as, for example, as propylene, and 5-methylene-2-norbornene. The interpolymers contain at least about 20% of ethylene units by weight, at least 25% of α-olefin units by weight, and at least about 0.03 gram-mole per 100 grams of the interpolymer and not over about 20% of the interpolymer of 5-methylene-2-norbornene.

Interpolymers derived from 2-alkyl-norbornadiene and their method of manufacture are disclosed and described in Canadian Patent 699,044 of Dec. 1, 1964, reference to which is hereby made. These interpolymers can be defined as sulfur-vulcanizable elastomeric interpolymers of ethylene, at least one α-monoolefin having the structure

R—CH=CH$_2$ wherein R is an alkyl radical of from 1–8 carbon atoms and at least one 2-alkyl-norbornadiene having from about 8 to 24 carbon atoms. The interpolymers have an iodine number between 5 and 60 and contain from about 20–72.5% by weight of ethylene units, 25–77.5% by weight of α-monoolefin units, and not more than about 25% of norbornadiene units.

Methods of preparing some of the above interpolymers and related terpolymers are also disclosed and described in Patents 3,162,620 and 3,211,709, reference to which is hereby made.

Interpolymers derived by using methyl tetrahydroindene as at least one of the nonconjugated dienes are suitable for the purposes of this invention. Such interpolymers and their method of preparation are disclosed and described in Belgian Patent 637,939, reference to which is hereby made. Methyl tetrahydroindene can be represented by the structural formula (V)

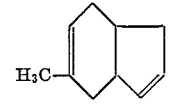

TACKIFIER ADDITIVE (B)

The tackifier additive is comprised of at least two specific rosin-base materials. The rosin-base materials are preferably first mixed together to provide a substantially homogeneous blend and added to and admixed with rubber component (A) in the blended form. It will be appreciated that the individual rosin-base materials of which the tackifier additive is comprised can be added separately to rubber component (A) if desired, followed by thorough mixing. For best results, however, it is recommended that the rosin-base materials of which the tackifier additive is comprised be first blended together prior to incorporation in rubber component (A).

The rosin-base materials of which tackifier additive (B) is comprised are, for convenience of reference, sometimes referred to hereinafter as rosin-base material I and rosin-base material II.

Rosin-base material I is a reaction product, having an acid number of less than about 5 and preferably less than about 1, derived by the reaction of (a) an ester of (i) a polyol selected from the group consisting of ethylene glycol, glycerol, and pentaerythritol, and (ii) a stabilized rosin of a bromine number of less than about 50 selected from the group consisting of hydrogenated rosin and the hydrogenated reaction product of rosin and dimethoxymethane and (b) diazomethane; acetone dimethylacetal; an alkylene oxide such as ethylene oxide, propylene oxide, 1-butene oxide, the 2-butene oxides, isobutylene oxide, cyclohexene oxide, styrene oxide, and mixtures of alkylene oxides. The amount of alkylene oxide or diazomethane or acetone dimethyl acetal employed in carrying out the reaction will be at least that required to provide a reaction product having an acid number as above set forth. In practice an excess of reactant (b) is used in carrying out the reaction. Unreacted reactant (b) is removed subsequently from the reaction mass by known procedures.

Bromine number is a measure of nonbenzenoid unsaturation in an organic substance and is expressed as number of centigrams of bromine added per gram of organic substance. An alcoholic solution of the sample is titrated with standard KBr-KBrO$_3$ solution in the presence of a high concentration of HCl. The end point is determined by a transistorized end point detector as described in ASTM Method E203–64.

Rosin-base material II is a reaction product, having an acid number of less than about 5 and preferably less than about 1, derived from reaction of (x) a stabilized rosin selected from the group consisting of disproportionated rosin and hydrogenated rosin having a bromine number of less than about 50, and (y) diazomethane; acetone dimethyl acetal; an alkylene oxide such as ethylene oxide, propylene oxide, 1-butene oxides, the 2-butene oxides, isobutylene oxide, cyclohexene oxide, styrene oxide, and mixtures of alkylene oxides. The amount of reactant (y) employed in carrying out the reaction will be at least that required to provide a reaction product having an acid number as above set forth. In practice excess reactant (y) is used and the unreacted portion subsequently removed from the reaction mass by known procedures.

The tackifier additive compositions of this invention can be comprised of, by weight, from about 80% to about 20% of rosin component I and from about 20% to about 80% of rosin component II. Preferred compositions are comprised, by weight, from about 60% to about 40% of rosin component I and from about 40% to about 60% of rosin component II. The above range of proportions can be departed from if desired. The amount of tackifier additive composition employed is that which will provide adequate building tack for the project at hand and is well within the skill of those versed in the art having before them the teachings of this invention. It has been determined that the optimum amount of tackifier additive composition will vary depending on its specific composition and on the specific interpolymer used. Usually an amount of, by weight, from about 5 parts to about 25 parts of tackifier additive for each 100 parts of interpolymer will produce adequate building tack. It is within the skill of one versed in the art, having before him the teachings of this invention, to provide a tackifier additive composition and in an adequate amount for the specific interpolymer with which he is concerned.

Rosin used for hydrogenation, for disproportionation, and for reaction with dimethoxymethane can be natural rosin, refined or unrefined (refined rosin will usually contain, by weight, about 90%–88% of rosin acids and about 10%–12% of inert material). Examples of natural rosin include natural wood rosin, natural gum rosin, and tall oil rosin. The pure or substantially pure acids of which rosin is comprised, such as abietic acid, can be used as the rosin source if desired. Refined wood rosin is preferred.

Disproportionated rosin is available commercially and will contain, by weight, about 0.5% abietic acid, from about 40% to 60% dehydroabietic acid, the remainder being mostly dihydro rosin acids and a small amount of neutral materials. Disproportionated rosin can be prepared by heat treatment of refined wood rosin, for example, by heat treatment in the presence of a catalyst such as iodine, sulfur dioxide, platinum, and the like catalyst. A suitable method for effecting disproportionation of rosin is disclosed in patent 2,138,183, reference to which is hereby made.

Hydrogenated rosin having a bromine number of less than about 50 is available commercially. Hydrogenation of rosin, refined wood rosin, for example, is accomplished under conditions to achieve saturation of at least about 75% of the available two double bonds of the rosin acid radicals present. Hydrogenated rosin can be prepared by contacting fluid, refined wood rosin with hydrogen, in the presence of activated nickel catalyst, under pressure (about 4000 to 5000 p.s.i.) and at a temperature of about 210° C. to about 230° C. for a period of time adequate to provide a hydrogenated rosin of desired bromine number. Methods of hydrogenating rosin are well known in the art.

The reaction products of rosin and dimethoxymethane are known and are available commercially. Dimethoxymethane is known also as methylal and dimethylformal. These reaction products together with their method of preparation are disclosed and described in Patent 2,720,513, reference to which is hereby made. Hydrogenation of this reaction product to a material having a bromine number of less than about 50 is accomplished in the same manner and under the same conditions used in hydrogenation of rosin, as above described.

The following example is illustrative of the preparation of rosin-dimethoxymethane reaction product.

In all the examples that follow, all parts and percentages are by weight unless otherwise specified.

Example 1

A solution of 200 parts N wood rosin in 250 parts benzene is placed in a reaction vessel and 65 parts dimethoxymethane and 75 parts acid clay catalyst are added. The resulting mixture is agitated for 2 hours at 120° C.–125° C. to provide a reaction mass. Rosin-dimethoxymethane reaction product having an acid number of 157 and a drop softening point of 116° C. is separated from other components of the reaction mass in a yield of about 200 parts.

ROSIN-BASE MATERIAL I

The following examples are illustrative of the preparation of rosin-base material I used in this invention. All hydrogenated products used in the examples have a bromine number of less than about 50.

Example 2

The apparatus for this and subsequently described rosin-base material preparations included an electrically heated autoclave having means adapted for agitation of the contents thereof, a pump for introducing alkylene oxide, and pressure and temperature indicating and control equipment.

The autoclave is initially charged with about 1035 parts of the glycerin ester of hydrogenated N wood rosin. The ester has an acid number of about 15. The ester charge is heated to 180° C. and ethylene oxide is pumped into the autoclave until the pressure in the autoclave rises to about 200 p.s.i.g. and, as the reaction proceeds, the pressure is maintained at about 200 p.s.i.g. by addition of more ethylene oxide. The reaction is terminated one-half hour after constant pressure within the autoclave is attained. This indicates that there is no further reaction of ethylene oxide and ester taking place. The reaction mass is recovered from the autoclave and unreacted ethylene oxide stripped therefrom by heating under vacuum. The ester-ethylene oxide reaction product has an acid number of less than 1.

Example 3

The procedure and apparatus of Example 2 are employed in this example, with the exception that the ester charge consists of about 1500 parts of the pentaerythritol ester of hydrogenated N wood rosin. The ester has an acid number of 14. The ester-ethylene oxide reaction product has an acid number of less than 1.

Example 4

The procedure and apparatus of Example 2 are employed. In this example the ester charge consists of about 1096 parts of the ethylene glycol ester of the hydrogenated reaction product of N wood rosin and dimethoxymethane. The N wood rosin-dimethoxymethane reaction product is prepared in accordance with Example 1 and has an acid number of 160. The ester has an acid number of 16. The ester-ethylene oxide reaction product has an acid number of less than 1.

Example 5

The procedure and apparatus of Example 2 are employed. The initial charge of this example consists of about 1500 parts of the glycerin ester of hydrogenated reaction product of N wood rosin and dimethoxymethane. The rosin-dimethoxymethane reaction product is prepared in accordance with Example 1 and has an acid number of 160. The ester has an acid number of 15. The ester-ethylene oxide reaction product has an acid number of less than 1.

Example 6

The procedure and apparatus of Example 2 are employed. The initial charge of this example consists of about 871 parts of the pentaerythritol ester of the hydrogenated reaction product of N wood rosin and dimethoxymethane. The rosin-dimethoxymethane reaction product is prepared in accordance with Example 1 and has an acid number of 160. The ester has an acid number of 17. The ester-ethylene oxide reaction product has an acid number of less than 1.

ROSIN-BASE MATERIAL II

The following examples illustrate the preparation of rosin-base materials II of tackifier additive. Hydrogenated products used in the examples have a bromine number of less than 50.

Example 7

The procedure and apparatus of Example 2 are employed. In this example the initial charge is about 890 parts disproportionated N wood rosin having an acid number of 155. The disproportionated rosin-ethylene oxide reaction product has an acid number of less than 1.

Example 8

The procedure and apparatus of Example 2 are employed. In this example the initial charge consists of about 1376 parts of hydrogenated N wood rosin having an acid number of 158. The hydrogenated rosin-ethylene oxide reaction product has an acid number of less than 1.

Example 9

The procedure and apparatus of Example 2 are employed. In this example the initial charge consists of 800 parts of disproportionated N wood rosin having an acid number of 155. Propylene oxide is employed as the alkylene oxide. The disproportionated rosin-propylene oxide reaction product has an acid number of 1.

Example 10

The example that follows, set forth in Table 1 below, illustrates compositions of this invention and their tack properties. The EPDM used in the composition of the example is a rubber terpolymer containing on a weight basis 40% ethylene, 55% propylene, and 4% 1,4-hexadiene, and on a rubber basis, 52% ethylene, 46% propylene, and 2% 1,4-hexadiene, and has a Mooney viscosity of about 70 ML–4–212° F. The oil used in the composition is a naphthenic petroleum oil, available commercially as Circosol 42XH and is used in the rubber art sometimes as a processing aid and in some instances as an extender for rubber. The oil has the following properties: API gravity, 18.2; specific gravity, 0.9454; flash point (open cup) 435° F.; Saybolt viscosity 85 at 210° F.; aniline point 174° F.; Viscosity-Gravity Constant (VGC) 0.885. The carbon black used is HAF black. All components of the compositions of the examples are thoroughly admixed to provide a substantially homogeneous composition prior to determining the tack properties.

Example 11

Example 10 is repeated with the exception that the tackifier additive employed has the composition 50% of Example 2 rosin-base material I and 50% of Example 7 rosin-base material II. Tack tests were made at the different levels of tackifier additive addition as set forth in Table 1 with the corresponding oil level addition (total 55 parts) and in each case tack property is determined as adequate.

Example 12

Example 11 is repeated using a tackifier additive consisting of 75% Example 5 rosin-base material I and 25% Example 7 rosin-base material II. At all levels of addition, tack is adequate.

Example 13

Example 11 is repeated using a tackifier additive consisting of 50% Example 5 rosin-base material I and 50% Example 7 rosin-base material II. At 5 parts, tack is poor. At the 20 parts level, tack is very good, and at all other levels tack is good.

Example 14

Example 11 is repeated using a tackifier additive consisting of 75% Example 6 rosin-base material I and 25% Example 7 rosin-base material II. Tack at all levels of addition is good.

Example 15

Example 11 is repeated using a tackifier additive consisting of 50% Example 6 rosin-base material I and 50% Example 7 rosin-base material II. Tack properties at all levels, except the 5 part level, which has fair tack, are good.

Example 16

Example 11 is repeated using a tackifier additive consisting of 75% Example 4 rosin-base material and 25% Example 7 rosin-base material. Tack, at all levels of addition, is good.

Example 17

Example 11 is repeated using a tackifier additive consisting of 50% Example 4 rosin-base material and 50% Example 7 rosin-base material. Tack is good at all levels except at the 15 parts level and here the tack is adequate for tire building purposes.

Example 18

Example 11 is repeated using a tackifier additive consisting of 75% Example 3 rosin-base material I and 25% Example 7 rosin-base material II. Tack properties at all levels are good, with the tack properties at the 10 parts level being the best of the five.

Example 19

Example 11 is repeated using a tackifier additive consisting of 50% Example 3 rosin-base material I and 50% Example 7 rosin-base material II. Tack properties at the 5 parts, 10 parts, 15 parts and 25 parts levels were adequate to good. The tack property at the 20 parts level was excellent.

TABLE 2

| | | | Composition | | |
|---|---|---|---|---|---|
| | | | | Tackifier Additive Composition | |
| | Carbon Black, parts | Oil, parts | Tackifier Additive, parts | Rosin-Base Material I | Rosin-Base Material II | Tack Properties |
| EPDM, parts: | | | | | | |
| 100 | 80 | 55 | None (¹) | | | Very poor. |
| 100 | 80 | 50 | 5 | 75% Example 2 | 25% Example 7 | Adequate. |
| 100 | 80 | 45 | 10 | do | do | Do. |
| 100 | 80 | 40 | 15 | do | do | Do. |
| 100 | 80 | 35 | 20 | do | do | Do. |
| 100 | 80 | 30 | 25 | do | do | Good. |

¹ Control.

Example 20

This example is similar to Example 10. In the composition of this example, the EPDM used is a rubbery terpolymer containing, on a weight basis, 34% ethylene, 60% propylene, and 6% dicyclopentadiene and, on a molar basis, 45% ethylene, 53% propylene, and 2% dicyclopentadiene. The terpolymer has a Mooney viscosity of 40–60 ML–4–212° F. The oil used in the composition is a petroleum of the naphthenic type, available commercially as Circosol 42XH. Carbon black used is the same as that in Example 10. Table 2 below sets forth tack properties.

available commercially as Philrich 5. Philrich 5 is a highly aromatic extending oil and is used in the rubber art sometimes as a processing aid and in some instances as an

TABLE II

| EPDM, parts: | Carbon Black, parts | Oil, parts | Tackifier Additive, parts | Tackifier Additive Composition Rosin-Base Material I | Tackifier Additive Composition Rosin-Base Material II | Tack Properties |
|---|---|---|---|---|---|---|
| 100 | 80 | 25 | 25 | 80% Example 3 | 20% Example 7 | Excellent. |
| 100 | 80 | 30 | 20 | do | do | Do. |
| 100 | 80 | 35 | 15 | do | do | Do. |
| 100 | 80 | 40 | 10 | do | do | Do. |
| 100 | 80 | 45 | 5 | do | do | Do. |
| 100 | 80 | 50 | None (1) | | | Very poor. |

1 Control.

Example 21

Example 20 is repeated except the tackifier additive is 70% Example 3 rosin-base material I and 30% Example 7 rosin-base material II. Tack tests were made at the different levels of tackifier additive addition as set forth in Table 2 with the corresponding oil level addition (total 50 parts). In each case the tack is good although not quite that of Example 20.

Example 22

Example 21 is repeated using a tackifier additive consisting of 60% Example 3 rosin-base material I and 40% Example 7 rosin base material II. Tack properties are good at all levels of addition.

Example 23

Example 21 is repeated using a tackifier additive consisting of 80% of Example 3 rosin-base material I and 20% of Example 8 rosin-base material II. Tack properties are excellent at all levels except the 5 parts level which tack property is nevertheless adequate for tire building operations.

Example 24

Example 21 is repeated using a tackifier additive consisting of 70% Example 3 rosin-base material I and 30% Example 8 rosin-base material II. Tack properties at the 10 parts, 15 parts, and 20 parts levels are excellent and good at the 5 parts and 25 parts levels.

Example 25

Example 21 is repeated using a tackifier additive consisting of 60% Example 3 rosin-base material I and 40% Example 8 rosin-base material II. At the 5 parts and 10 parts level, the tack properties are excellent. At the 15 parts and 20 parts levels, the tack properties are good, and at the 25 parts level the tack is fair but adequate.

Example 26

This example is a repeat of Example 20 with the exception that the oil is a highly aromatic extender oil extender for rubber. The oil has the following properties: API gravity, 11.6; specific gravity, 0.9888; flash point (open cup), 480° F.; Saybolt viscosity 175 at 210° F.; aniline point, 210° F. The tack property at the 5 parts level is good; tack properties of all the other levels are excellent.

Example 27

Example 21 is repeated with the exception that the oil used is the same as that used in Example 26. Tack properties at all levels are excellent.

Example 28

Example 22 is repeated with the exception that the oil used is the same as that used in Example 26. Tack properties at all levels are excellent.

Example 29

Example 23 is repeated with the exception that the oil used is the same as that used in Example 26. Tack properties at all levels are excellent.

Example 30

Example 24 is repeated with the exception that the oil used is the same as that used in Example 26. Tack properties at all levels are excellent.

Example 31

Example 25 is repeated with the exception that the oil used is the same as that used in Example 26. Tack properties at all levels are excellent.

Without tack, it is impossible to build tires, short of unrealistic procedures and costs from EPDM. The difficulty is not so much to develop tack per se as it is to do it without impairing vulcanization rate and the final properties, such as modulus elongation, heat build-up, and the like, of the vulcanized product.

The following examples, set forth in tabulated form in Table 3 and Table 4, show physical properties of vulcanizates of compositions of this invention. All components are thoroughly blended and then cured under heat and pressure to provide the vulcanizate. Unless otherwise indicated all vulcanizates were prepared by curing under pressure for one hour at 300° F.

TABLE 3

| Components: | Example No. | | | | | | | | | |
|---|---|---|---|---|---|---|---|---|---|---|
| | 32 | 33 | 34 | 35 | 36 | 37 | 38 | 39 | 40 | 41 |
| EPDM [1], parts | 100 | 100 | 100 | 100 | 100 | 100 | 100 | 100 | 100 | 100 |
| Naphthenic Oil[2], parts | 45 | 45 | 45 | 45 | 45 | 45 | 45 | 45 | 45 | 45 |
| HAF, Carbon Black, parts | 80 | 80 | 80 | 80 | 80 | 80 | 80 | 80 | 80 | 80 |
| Zinc Oxide, parts | 5 | +5 | 5 | 5 | 5 | 5 | 5 | 5 | 5 | 5 |
| 2-mercaptobenzthiazole, parts | 0.75 | 0.75 | 0.75 | 0.75 | 0.75 | 0.75 | 0.75 | 0.75 | 0.75 | 0.75 |
| Sulfur, parts | 1.5 | 1.5 | 1.0 | 1.0 | 1.5 | 1.5 | 1.0 | 1.0 | 1.0 | 1.0 |
| Accelerator [3] | TMTM | TMTM | TMTD | TMTD | TBTM | TBTM | TBTD | TBTD | TMTD | TMTD |
| 10 Parts Tackifier [4] | None | A | None | A | None | A | None | A | B | C |
| Vulcanizate Properties: | | | | | | | | | | |
| Modulus at 100%, p.s.i | 265 | 280 | 225 | 250 | 178 | 175 | 210 | 210 | 220 | 225 |
| Modulus at 300%, p.s.i | 1,420 | 1,350 | 1,180 | 1,240 | 815 | 800 | 1,080 | 1,100 | 1,240 | 1,180 |
| Tensile strength, p.s.i | 2,760 | 2,750 | 2,900 | 2,800 | 2,700 | 2,750 | 2,800 | 2,750 | 2,860 | 2,900 |
| Elongation, percent | 550 | 520 | 570 | 560 | 660 | 680 | 610 | 610 | 570 | 570 |
| Shore A Hardness | 50 | 54 | 50 | 54 | 50 | 50 | 51 | 50 | 50 | 50 |
| Curometer $T_{90}$, min.[5] | 20 | 24.5 | 17 | 13 | 25 | 22.5 | 14.25 | 16 | 16.5 | 14 |

[1] As in Example 10.
[2] Circosol 42XH.
[3] Accelerators are designated as:
   TBTD = Tetrabutylthiuram disulfide at 2.6 parts.
   TMTD = Tetramethylthiuram disulfide at 1.5 parts.
   TBTM = Tetrabutylthiuram monosulfide at 2.7 parts.
   TMTM = Tetramethylthiuram monosulfide at 1.5 parts.
[4] Tackifier additives are as follows:
   None, 10 parts of additional oil used as a control.
   A, Blend consisting of 75% Example 2 material I and 25% Example 7 material II.
   B, Blend consisting of 75% Example 3 material I and 25% Example 7 material II.
   C, Blend consisting of 50% Example 5 material I and 50% Example 7 material II.
[5] Shawbury curometer test run at 300° F.

TABLE 4

| Components: | Example No. | | | | | | | | |
|---|---|---|---|---|---|---|---|---|---|
| | 42 | 43 | 44 | 45 | 46 | 47 | 48 | 49 | 50 |
| EPDM, parts | [1]100 | [1]100 | [2]100 | [2]100 | [3]100 | [3]100 | [1]100 | [1]100 | 100 |
| Naphthenic Oil[4], parts | 45 | 45 | 45 | 45 | 45 | 45 | 45 | 45 | 45 |
| HAF Carbon Black, parts | 80 | 80 | 80 | 80 | 80 | 80 | 80 | 80 | 80 |
| Zinc Oxide, parts | 5 | 5 | 5 | 5 | 5 | 5 | 5 | 5 | 5 |
| 2-mercaptobenzthiazole, parts | 0.75 | 0.75 | 0.75 | 0.75 | 0.75 | 0.75 | 0.75 | 0.75 | 0.75 |
| Sulfur, parts | 1.50 | 1.50 | 1.50 | 1.50 | 1.50 | 1.50 | 1.50 | 1.50 | 1.50 |
| Accelerator [5] | TMTM | TMTM | TMTM | TMTM | TMTM | TMTM | TMTM | TMTM | TMTM |
| 10 Parts Tackifier [6] | None | D | None | E | None | E | None | F | G |
| Vulcanizate Properties: | | | | | | | | | |
| Modulus at 100%, p.s.i | | | 285 | 295 | 370 | 315 | 285 | 280 | 315 |
| Modulus at 300%, p.s.i | 1,010 | 990 | 1,090 | 1,240 | 1,400 | 1,340 | 1,275 | 1,300 | 1,150 |
| Tensile Strength, p.s.i | 2,400 | 2,385 | 2,350 | 2,385 | 2,380 | 2,260 | 2,485 | 2,470 | 2,351 |
| Elongation, percent | 585 | 575 | 570 | 550 | 510 | 500 | 510 | 500 | 515 |
| Shore A Hardness | 56 | 56 | 60 | 57 | 63 | 61 | 59 | 60 | 57 |
| Curometer, $T_{90}$, min.[7] | a 12 | a 10 | b 25 | b 23.5 | b 25 | b 23.5 | a 6.5 | a 6.7 | a 51 |

[1] As in Example 10, cured 30 minutes at 320° F.
[2] As in Example 20, cured 30 minutes at 320° F.
[3] As in Example 20, cured 90 minutes at 320° F.
[4] Circosol 42XH.
[5] Accelerator designated as:
   TMTM = tetramethylthiuram monosulfide at 1.5 parts.
[6] Tackifier additives are as follows:
   None, 10 parts of additional oil used as a control.
   D, Blend consisting of 40% Example 3 material I and 60% Example 8 material II.
   E, Blend consisting of 80% Example 3 material I and 20% Example 8 material II.
   F, Blend consisting of 50% Example 3 material I and 50% Example 8 material II.
   G, Blend consisting of 50% Example 3 material I and 50% Example 9 material II.
[7] a Shawbury curometer test run at 320° F.; b Shawbury curometer test run at 300° F.

As above set forth, the novel tackifier compositions of this invention can be used to provide tack in rubbery or elastomeric copolymers of ethylene and another copolymerizable monomer selected from α-monoolefins. An elastomeric copolymer of ethylene and propylene, referred to as EPR, is an example of the above copolymers. Specific examples of suitable copolymers of ethylene and propylene are those that have a propylene content of from about 25 mole percent to 60 mole percent and which have a reduced specific viscosity within the range of about 2 to about 8. See British Patent 857,183 for a description of such elastomeric copolymers.

Example 51

About 15 parts of the tackifier composition of Example 21 is thoroughly admixed with an elastomeric copolymer of ethylene and propylene having about 34 mole percent propylene and having an RSV of about 4.1. The resulting elastomeric composition has good tack and the added tackifier does not affect adversely the cured properties of the elastomeric copolymer.

Examples 52–55

Example 51 is repeated using the tackifier compositions of Examples 22, 23, 24, and 25, respectively, with equally satisfactory results.

Known extending oils for rubber can be incorporated into the novel compositions of this invention without untoward effect. The extending oils which can be used cover a wide range of oils having various chemical and physical properties. Any of the well-known oils that are compatible with rubber, ranging from very light to very viscous, can be used as extending oils in accordance with well-known practices. Whitby (Synthetic Rubber, page 219, John Wiley & Sons, 1954) indicates that extender oils can be divided into three broad classes, namely, naphthenic, aromatic, and highly aromatic. For nondiscoloring rubbers, naphthenic oils are usually employed, while aromatic and highly aromatic oils are preferred for discoloring rubbers. Thus, suitable extender oils include pine tar, light lubricating oils, and the like. Circosol 2XH (a proprietary designation) is a light lubricating oil fully described in Rubber Age, vol. 70, No. 6, pages 735–747, March 1953, and is a proprietary product of Sun Oil Company, and is a particularly suitable extender oil. Circosol 2XH contains hydrocarbons of high molecular weight, in the form of a heavy, viscous, transparent, pale green, odorless liquid of low volatility; it has a specific gravity of 0.940, and a Saybolt Universal viscosity at 100° F. of about 2000 seconds. Other extender oils are disclosed and described in U.S. Patent 2,964,083, reference to which is hereby made. The amount of extender oil employed will be from about 15 to 150 parts by weight for each 100 parts by weight of rubber component.

The usual fillers, reinforcing agents, antioxidants, vulcanizers, extenders, plasticizers, softeners, processing aids, as well as activators and accelerators well known in the preparation of natural rubber and synthetic rubber compositions, can be employed in accordance with this invention.

Fillers that can be employed included aluminium flake, antimony sulfide, asbestos, barium sulfate, cadmium sulfied, appropriate grades of carbon black, chromic oxide, clay, such as bentonite, cotton linters, iron oxide, lime, litharge, lithopone, magnesium carbonate, magnesium oxide, silica, slate fluor, talc, titanium oxide, whiting, zinc oxide, zinc sulfide, and the like. Zinc oxide, reinforcing grades of carbon black, hydrated silica, calcium carbonate, and the like, can be employed as reinforcing agents. Suitable pigments, such as ultramarine, vermillion, or the like, can be employed to impart to the composition a desired color.

It is to be understood that the above description and examples are illustrative of this invention and not in limitation thereof.

What I claim and desire to protect by Letters Patent is:

1. A composition comprised of, by weight,
   (I) from about 80% to about 20% of a reaction product derived by reaction of (a) an ester of (i) a polyol selected from the group consisting of ethylene glycol, glycerol, and pentaerythritol and (ii) a stabilized rosin of a bromine number of less than 50 and (b) a material selected from the group consisting of diazomethane, acetone dimethylacetal, and an alkylene oxide, said reaction product having an acid number of less than about 5, and
   (II) from about 20% to about 80% of a reaction product derived by reaction of (x) a rosin material selected from the group consisting of disproportionated rosin and hydrogenated rosin having a bromine number of less than 50 and (y) a material selected from the group consisting of diazomethane, acetone dimethylacetal, and an alkylene oxide, said reaction product having an acid number of less than about 5.

2. A composition comprised of, by weight,
   (I) from about 80% to about 20% of a reaction product having an acid number of less than about 5 derived by reaction of a (a) an ester of (i) a polyol selected from the group consisting of ethylene glycol, glycerol, and pentaerythritol and (ii) hydrogenated rosin of a bromine number of less than 50 and (b) an alkylene oxide, and
   (II) from about 20% to about 80% of a reaction product having an acid number of less than about 5 derived by reaction of (x) a rosin material selected from the group consisting of disproportionated rosin and hydrogenated rosin of a bromine number of less than 50 and (y) an alkylene oxide.

3. The composition of claim 2 wherein (i) is glycerol.

4. The composition of claim 2 wherein (i) is pentaerythritol.

5. The composition of claim 3 wherein (b) is ethylene oxide and (y) is ethylene oxide.

6. The composition of claim 4 wherein (b) is ethylene oxide and (y) is ethylene oxide.

7. A composition comprising
   (A) an elastomeric polymer selected from the group consisting of (1) elastomeric copolymers of ethylene and at least one α-olefin having the structure R—CH=CH₂ wherein R is a $C_1$-$C_8$ alkyl radical, (2) unsaturated interpolymers of ethylene, at least one α-olefin having the structure R—CH=CH₂ wherein R is a $C_1$-$C_8$ alkyl radical, and at least one nonconjugated hydrocarbon diene, and (3) mixtures of (1) and (2), and
   (B) a tackifying amount of a composition comprised of, by weight,
   (I) from about 80% to about 20% of a reaction product derived by reaction of (a) an ester of (i) a polyol selected from the group consisting of ethylene glycol, glycerol, and pentaerythritol and (ii) a stabilized rosin of a bromine number of less than 50 and (b) a material selected from the group consisting of diazomethane, acetone dimethylacetal, and an alkylene oxide, said reaction product having an acid number of less than about 5, and
   (II) from about 20% to about 80% of a reaction product derived by reaction of (x) a rosin material selected from the group consisting of disproportionated rosin and hydrogenated rosin having a bromine number of less than 50 and (y) a material selected from the group consisting of diazomethane, acetone dimethylacetal, and an alkylene oxide, said reaction product having an acid number of less than about 5.

8. The composition of claim 7 wherein (B) is a composition comprised of, by weight,
   (I) from about 80% to about 20% of a reaction product having an acid number of less than about 5 derived by reaction of (a) an ester of (i) a polyol selected from the group consisting of ethylene glycol, glycerol, and pentaerythritol and (ii) hydrogenated rosin of a bromine number of less than 50 and (b) an alkylene oxide, and
   (II) from about 20% to about 80% of a reaction product having an acid number of less than about 5 derived by reaction of (x) a rosin material selected from the group consisting of disproportionated rosin and hydrogenated rosin of a bromine number of less than 50 and (y) an alkylene oxide.

9. The composition of claim 7 wherein (B) is a composition comprised of, by weight,
   (I) from about 80% to about 20% of a reaction product having an acid number of less than about 5 derived by reaction of (a) an ester of (i) glycerol and (ii) hydrogenated rosin of a bromine number of less than 50 and (b) an alkylene oxide, and
   (II) from about 20% to about 80% of a reaction product having an acid number of less than about 5 derived by reaction of (x) a rosin material selected from the group consisting of disproportionated rosin and hydrogenated rosin of a bromine number of less than 50 and (y) an alkylene oxide.

10. The composition of claim 7 wherein (B) is a composition comprised of, by weight,
    (I) from about 80% to about 20% of a reaction product having an acid number of less than about 5 derived by reaction of (a) an ester of (i) pentaerythritol and (ii) hydrogenated rosin of a bromine number of less than 50 and (b) an alkylene oxide and
    (II) from about 20% to about 80% of a reaction product having an acid number of less than about 5 derived by reactions of (x) a rosin material selected from the group consisting of disproportionated rosin and hydrogenated rosin of a bromine number of less than 50 and (y) an alkylene oxide.

11. The composition of claim 7 wherein (B) is a composition comprised of, by weight,
    (I) from about 80% to about 20% of a reaction product having an acid number of less than about 5 derived by reaction of (a) an ester of (i) glycerol and (ii) hydrogenated rosin of a bromine number of less than 50 and (b) ethylene oxide, and
    (II) from about 20% to about 80% of a reaction product having an acid number of less than about 5 derived by reaction of (x) a rosin material selected from the group consisting of disproportionated rosin and hydrogenated rosin of a bromine number of less than 50 and (y) ethylene oxide.

12. The composition of claim 7 wherein (B) is a composition comprised of, by weight,
    (I) from about 80% to about 20% of a reaction product having an acid number of less than about 5 derived by reaction of (a) an ester of (i) pentaerythritol and (ii) hydrogenated rosin of a bromine number of less than 50 and (b) ethylene oxide, and
    (II) from about 20% to about 80% of a reaction product having an acid number of less than about 5 derived by reaction of (x) a rosin material selected from the group consisting of disproportionated rosin and hydrogenated rosin of a bromine number of less than 50 and (y) ethylene oxide.

13. The composition of claim 7 wherein (A) is an elastomeric copolymer of ethylene and propylene.

14. The composition of claim 8 wherein (A) is an elatsomeric copolymer of ethylene and propylene.

15. The composition of claim 9 wherein (A) is an elastomeric copolymer of ethylene and propylene.

16. The composition of claim 10 wherein (A) is an elastomeric copolymer of ethylene and propylene.

17. The composition of claim 11 wherein (A) is an elastomeric copolymer of ethylene and propylene.

18. The composition of claim 12 wherein (A) is an elastomeric copolymer of ethylene and propylene.

19. The composition of claim 7 wherein (A) is an unsaturated interpolymer of ethylene, propylene, and at least one nonconjugated hydrocarbon diene.

20. The composition of claim 8 wherein (A) is an unsaturated interpolymer of ethylene, propylene, and at least one nonconjugated hydrocarbon diene.

21. The composition of claim 9 wherein (A) is an unsaturated interpolymer of ethylene, proylene, and at least one nonconjugated hydrocrabon diene.

22. The composition of claim 10 wherein (A) is an unsaturated interpolymer of ethylene, propylene, and at least one nonconjugated hydrocarbon diene.

23. The composition of claim 11 wherein (A) is an unsaturated interpolymer of ethylene, proylene, and at least one nonconjugated hydrocarbon diene.

24. The composition of claim 12 wherein (A) is an unsaturated interpolymer of ethylene, propylene, and at least one nonconjugated hydrocrabon diene.

References Cited

UNITED STATES PATENTS

| | | | |
|---|---|---|---|
| 2,720,513 | 10/1955 | Rummelgburg | 260—97 |
| 3,162,620 | 12/1964 | Gladding | 260—80.78 |
| 3,211,709 | 10/1965 | Alamck et al. | 260—80.78 |
| 3,331,804 | 7/1967 | Fogiel | 260—27 |

DONALD E. CZAJA, Primary Examiner

W. E. PARKER, Assistant Examiner

U.S. Cl. X.R.

260—80.7, 80.78, 97